C. G. ARMSTRONG.
PRESSURE REDUCER.
APPLICATION FILED SEPT. 7, 1907.
977,427.
Patented Dec. 6, 1910.
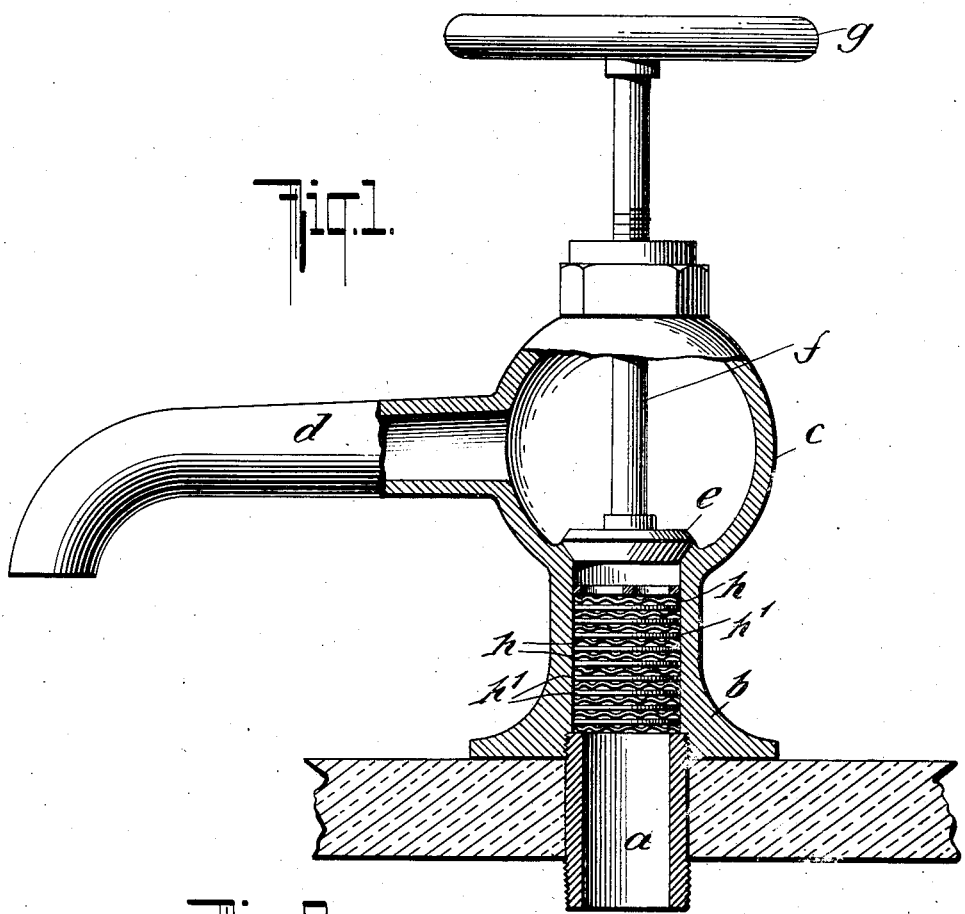
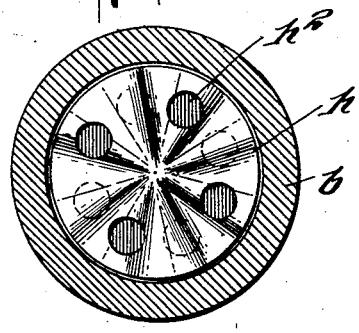
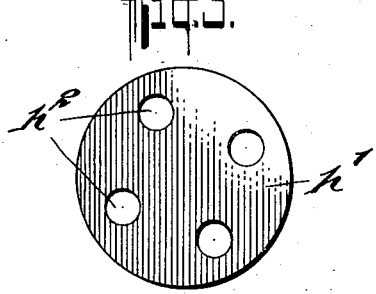
Chas. G. Armstrong,
Inventor,
By his Attorney
John K. Macdonald.
Witnesses:

UNITED STATES PATENT OFFICE.

CHARLES G. ARMSTRONG, OF ORANGE, NEW JERSEY.

PRESSURE-REDUCER.

977,427.            Specification of Letters Patent.      Patented Dec. 6, 1910.

Application filed September 7, 1907. Serial No. 391,804.

*To all whom it may concern:*

Be it known that I, CHARLES G. ARMSTRONG, of the city of Orange, Essex county, and State of New Jersey, have invented certain new and useful Improvements in Pressure-Reducers, of which the following is a full, clear, and exact specification, such as will enable others skilled in the art to which it appertains to make and use the same.

The object of my invention is to provide for a valve a pressure-reducer, for reducing the pressure of fluids passing through it. Such device is particularly useful in buildings where the water is under high pressure and is discharged with great velocity, thereby causing it to splash from the basin into which it may be discharged.

In carrying out my invention I provide in the passageway of a valve a number of baffles, preferably in the form of undulated or corrugated disks, each disk being provided with several small openings, to admit the passage of water or other fluids, said disks being so arranged that the openings of one do not register with those adjoining, the result of which is that as the water or other fluid passes through the openings in the first disk, it is slightly obstructed by the face of the adjoining disk between its own respective openings, and so on through the remaining disks. If the pressure of the water be unusually great, the disks are compressed upon each other, thereby further obstructing the flow and reducing it to its normal pressure. By properly proportioning the openings of the disks, any desired pressure may be obtained.

To secure the most satisfactory operation of the device, the disks must be prevented from nesting with each other. This I accomplish by varying the number, or size, of the corrugations of one disk from those of the adjoining disks, or by inserting between every two corrugated disks a disk without corrugations. The same result can, no doubt, be secured by any means that will prevent axial movement of the disks and secure them in the position in which they may be arranged.

It is obvious that the preferred form of the baffles herein shown may be varied in numerous details without departing from the spirit of my invention.

My invention involves various other features of major or minor importance, and all will be fully set forth hereinafter and particularly pointed out in the claims.

Reference is had to the accompanying drawings, which illustrate, as an example, one manner in which the various features of my invention may be embodied, in which drawings, Figure 1 is a vertical section of a faucet containing my device. Fig. 2 is a plan view of one of the corrugated baffles. Fig. 3 is a plan view of a disk without corrugations, which I insert between the corrugated disks to prevent their nesting.

$a$ indicates the supply pipe which leads into the base $b$ of the faucet. Surmounting the base $b$ is a shell or body $c$ from which the spout $d$ leads.

$e$ indicates the valve or gate of the faucet which is shown seated in Fig. 1 and which is adapted to be moved upward from its seat (thus opening the passageway) by means of the stem $f$ which passes out of the top of the faucet and has a hand-wheel $g$ secured thereto. This stem co-acts with any suitable means by which, upon rotating the hand-wheel $g$, the stem is given a vertical axial movement, causing it to move the valve $e$ from its seat, or to permit the valve to return thereto.

Fitting in the central passage of the base through which the water must flow are the corrugated baffle disks $h$, and between them the disks without corrugations $h'$. In these disks are several small openings $h^2$. These disks are formed of metal, every other disk being corrugated or undulated, as shown in Fig. 1, and are resilient, so that they may be compressed more or less closely against each other. Since the water in flowing through the openings in one of the baffles is obstructed by the face of its adjoining baffle, when the baffles are so arranged that the openings in one do not register with those of the adjoining baffles, it is clear that, as the baffles are compressed by unusual pressure, the water will be throttled or held back and reduced to the normal flow. It is obvious, however, that the referred-to openings in the disks may be omitted, in which case the disks should be of such size that there will be room for the fluid to pass around their sides.

In the operation of the invention, when the valve $e$ is raised from its seat, the body of water in the supply pipe $a$ passes through the openings in the baffles, $h^2$, and through the valve $e$. In passing through the baffles, as already stated, the water is obstructed by the face of each successive baffle between its respective openings; and, if the pressure of the water, or other fluid, be unusually great, the disks are compressed upon each other, thereby still further reducing the volume of water passing through the baffles until it reaches its normal pressure. This reduced volume of water passes into the delivery spout $d$ with a uniform flow. By properly proportioning the parts, a uniform flow of any degree of pressure may be maintained.

It is obvious that, while my invention is especially designed for use in connection with valves, it is equally adapted for use in pipe lines at points where a reduction in pressure is desired.

Having thus specifically described the preferred embodiment of my invention, what I claim as new and desire to secure by Letters Patent of the United States, is:

1. A pressure-reducer consisting of a number of compressible baffles acting one upon another by fluid pressure and adapted to effect a uniformity in the fluid flow.

2. A pressure-reducer consisting of a number of resilient disks, provided with corrugations, and adapted to effect a uniformity in the fluid flow by the compression of one disk upon another by excessive fluid pressure.

3. A pressure-reducer consisting of a number of baffles, provided with corrugations and adapted to close one upon another by fluid pressure, thereby effecting a uniformity in fluid flow.

4. A pressure-reducer consisting of a number of undulated or corrugated baffles, having small openings therein and so arranged that the openings of one baffle do not register with the openings of the adjoining baffles, whereby in passing through the baffles the fluid is obstructed by the faces of the respective baffles and the pressure thereby reduced.

5. A pressure-reducer consisting of a number of non-nesting baffles arranged with opposing faces compressible by fluid pressure and adapted to maintain uniform flow of fluid.

6. A pressure-reducer consisting of a number of resilient disks provided with corrugations or the like and a number of plain disks alternated with said corrugated disks, for the purpose of preventing the nesting of the disks.

7. In a faucet, the combination of a number of compressible baffles acting one upon another and adapted to throttle the fluid flow.

8. In a faucet, the combination of a number of baffles provided with corrugations for the purpose of separating one from the other and adapted to throttle the fluid flow.

9. In a faucet, the combination of a number of baffles in the passage-way to the valve chamber, said baffles being provided with corrugations, for the purpose of separating one from another, and adapted to close upon each other by fluid pressure, thereby effecting a uniformity of fluid flow.

10. In a faucet, the combination of a number of baffles, having small openings therein and so arranged that the openings of one baffle do not register with the openings of the others, whereby in passing through the baffles the fluid is obstructed by the faces of the respective baffles and the pressure thereby reduced.

11. In a device of the class described, the combination of a number of undulated or corrugated baffles having small openings therein, and so arranged that the openings of one baffle will not register with the opening of the other baffles.

12. In a device of the class described, the combination of a number of non-nesting compressible baffles adapted to maintain uniform flow of fluid.

13. In a faucet, the combination of a number of resilient disks provided with corrugations, and a number of plain disks alternated with the first mentioned disks, for the purpose of preventing the nesting of the disks.

14. In a device of the class described, the combination of a plurality of baffles having small openings therein and so arranged that the openings of one baffle do not register with the openings of the others.

In testimony whereof, I have signed my name to this specification in the presence of two subscribing witnesses.

CHARLES G. ARMSTRONG.

Witnesses:
J. K. MACDONALD,
I. B. OWENS.